United States Patent [19]

Einhaus

[11] Patent Number: 4,694,449
[45] Date of Patent: Sep. 15, 1987

[54] RECORD PLAYER WITH A SQUARE, VISCOUSLY DAMPED PICK-UP ARM LIFT ROD

[75] Inventor: Hermanus F. Einhaus, Eindhoven, Netherlands

[73] Assignee: U.S. Philips Corporation, New York, N.Y.

[21] Appl. No.: 751,418

[22] Filed: Jul. 2, 1985

[30] Foreign Application Priority Data

Jul. 6, 1984 [NL] Netherlands ............... 8402144

[51] Int. Cl.⁴ .............. G11B 3/08; G11B 17/06; G11B 21/12
[52] U.S. Cl. ................................. 369/246; 369/230
[58] Field of Search .................. 369/230, 246, 245

[56] References Cited

U.S. PATENT DOCUMENTS 3,727,922  4/1973  Igata .................................. 369/230
4,356,560  10/1982 Ohnishi ............................. 369/230
4,445,210  4/1984  Adachi .............................. 369/230

FOREIGN PATENT DOCUMENTS 56-54601  5/1981  Japan .
1192787   5/1970  United Kingdom .............. 369/230

*Primary Examiner*—Steven L. Stephan
*Attorney, Agent, or Firm*—David R. Treacy

[57] ABSTRACT

A lifting device, for moving a pick-up arm upwards and downwards, has a lift rod guided by a guide element formed integrally with the deck plate. The lift rod has a pair of adjoining planar walls intersecting each other at an angle, and engaging a corresponding pair of guide walls of the guide element. A highly viscous damping material is arranged between these engaging walls. An oblique compression spring presses the lift rod downward and sideways into engagement with the guide walls, the spring force being directed in a plane which bisects the angle formed by the lift rod walls.

9 Claims, 5 Drawing Figures

RECORD PLAYER WITH A SQUARE, VISCOUSLY DAMPED PICK-UP ARM LIFT ROD

BACKGROUND OF THE INVENTION

The invention relates to record player comprising a deck plate, which carries a turntable and a pick-up arm, and a lifting device which can be moved upwards and downwards to lift and lower the pick-up arm relative to the upper side of the turntable. The lifting device comprises an arm support and a lift rod which forms an integral unit with said support and is guided by a guide element connected to the deck plate. The lift rod is engaged by an actuating member for moving the lifting device upwards and downwards, and by damping means which comprise a highly viscous substance for damping at least the downward movement of the lifting device.

Such a record player is known from Patents Abstracts of Japan, Volume 5, nol. 115 (p.72) (787) July 24, 1981 and JP-A-No. 5654601. This known record player has a damped-action lifting device in order to ensure that a stylus carried by the pick-up arm is lowered gently onto a record on the turntable. In the known record players the lifting device comprises a comparatively large number of parts. These parts include a separate guide sleeve mounted in the deck plate, which sleeve ensures that the vertical movements of the lift rod are performed accurately; and damping means which are arranged underneath the deck plate, which utilizes a hydraulically damped lever. The lever is separately connected to the deck plate and cooperates with a separate actuating rod on the lifting device. Thus, the known record players have intricate, comparatively bulky and relatively expensive lifting devices. These devices add substantially to the overall price of the record player.

SUMMARY OF THE INVENTION

It is the object of the invention to provide a record player with a compact lifting device which comprises a small number of parts and which is cheap to produce.

To this end the invention is characterized in that the lift rod comprises a pair of longitudinal peripheral walls which make an angle with each other and which slide along a pair of guide walls of the guide element, the guide element forming an integral unit with the deck plate. The highly viscous substance is retained between these walls of the lift rod and the guide walls. A spring element arranged between the deck plate and the lift rod exerts a force on the lift rod. This force is directed downwardly towards the line of intersection between the planes of said walls of the lift rod, and urges these walls against the guide walls. Thus, the record player in accordance with the invention can be equipped with a lifting device comprising only two parts, namely the unit comprising the arm support and the lift rod, and the spring element, the guide walls being formed integrally with the deck plate.

During assembly only the highly viscous substance need be applied between the walls of the lift rod and the guide walls, after which the lifting device is ready for use. The lifting device is particularly suitable for manufacture from a plastic material by injection molding, because possible tolerances are effectively compensated for by the cooperating walls of the lift rod and the guide walls, and the side thrust from the spring. The lifting device renders the record player in accordance with the invention very suitable for low-cost mass production.

A preferred embodiment of the invention is characterized in that the lift rod has a square cross-section and the force vector of the spring element extends in a plane which bisects the angle between said walls of the lift rod. With a square cross-section the lift rod and thus the lifting device can readily be formed by injection-molding. This process provides a proper engagement of the walls of the lift rod with the guide walls, which is important in order to retain the highly viscous substance between these walls. Another preferred embodiment of the invention is characterized in that the spring element is a helical spring and in that a recess with a cylindrical wall is formed in the lift rod at a location where the walls of a pair of adjoining peripheral walls of the lift rod join each other. The recess has a central axis situated in the bisecting plane and contains that end portion of the helical spring which is remote from the deck plate. If the lifting device is injection-molded the recess can be positioned easily and accurately in the lift rod, so that the direction of the force exerted by the spring of the lifting device can be defined accurately by the position of the central axis of the recess.

Yet another preferred embodiment of the invention is characterized in that the arm support is disposed asymmetrically towards at least one of the walls of the first-mentioned pair of walls of the lift rod relative to a plane of symmetry of the lift rod. Thus, when the pick-up arm is lifted and lowered relative to the turntable the pick-up arm exerts an auxiliary torque on the lift rod via the arm support. This torque ensures that near the top of at least one guide wall the lift rod remains firmly urged against this wall. This ensures a constant and correct guidance near the upper ends of the guide walls.

Still another preferred embodiment of the invention is characterized in that at least near the location where it adjoins the deck plate the guide element is of tubular shape with a square cross-section and comprises a second pair of guide walls which, at a distance below the deck plate, are formed with an opening through which the spring element passes to act on the lift rod. Since during guiding of the lifting device the guide element cooperates in practice with the first-mentioned pair of walls of the lift rod, the walls of the second pair of guide walls may readily be formed with openings. Such an opening is used for the passage of the spring which acts on the lift rod. Again it is advantageous that tolerances of the guide element have no adverse effect on the correct operation of the lifting device.

A preferred embodiment of the invention is characterized in that the first-mentioned pair of guide walls are flat, the first-mentioned pair of walls of the lift rod engage the respective guide walls adjacent the edges, and between the first-mentioned pair of walls of the lift rod and the respective guide walls gaps are formed which contain the highly viscous substance. This provides a capillary action between the first-mentioned pair of guide walls and the first-mentioned pair of walls of the lift rod, which ensures that the highly viscous substance, such as silicone oil, is retained between these walls. The advantage of making the guide walls flat is that the deck plate can easily be formed by injection-molding. This is important because the deck plate is manufactured in a comparatively large molding. The guide walls may then even have a slight taper relative to each other. This does not affect the operation of the lifting device, provided that said guide walls are flat.

A record player embodying the invention will now be described in more detail, by way of example, with reference to the accompanying drawings.

DESCRIPTION OF THE PREFERRED EMBODIMENT

Figure 1:
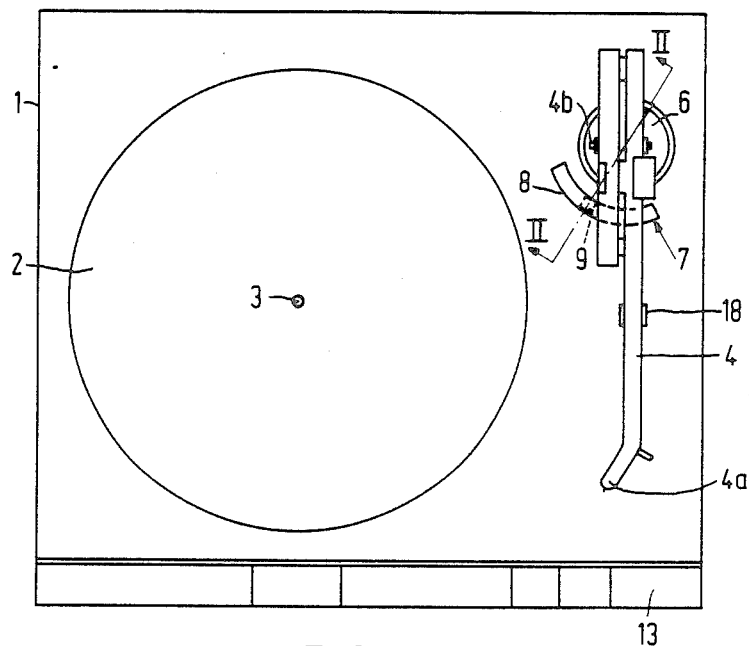
FIG. 1 is a plan view of a record player in accordance with the invention.

The record player shown in FIG. 1 comprises a deck plate 1 in which a turntable is mounted for rotation about an axis 3. The deck plate 1 carries a pick-up arm 4 provided with a pick-up head 4a. The pick-up head 4a carries a stylus by means of which a gramophone record on the turntable 3 can be played. The pick-up arm 4 is pivotable about a pivot 4b (see also FIG. 2) which extends parallel to the deck plate and which connects the pick-up arm to an arm support 5 mounted on a rotatable disc 6. The disc 6 and hence the pick-up arm 4 are rotatable about an axis 6a which extends perpendicularly to the deck plate.

Figure 3:
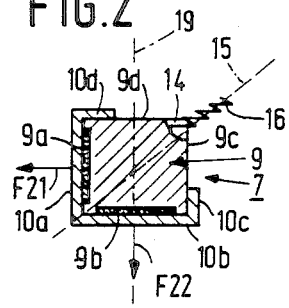
FIG. 3 is an enlarged-scale sectional view taken on the lines III—III in FIG. 2.
Figure 4:
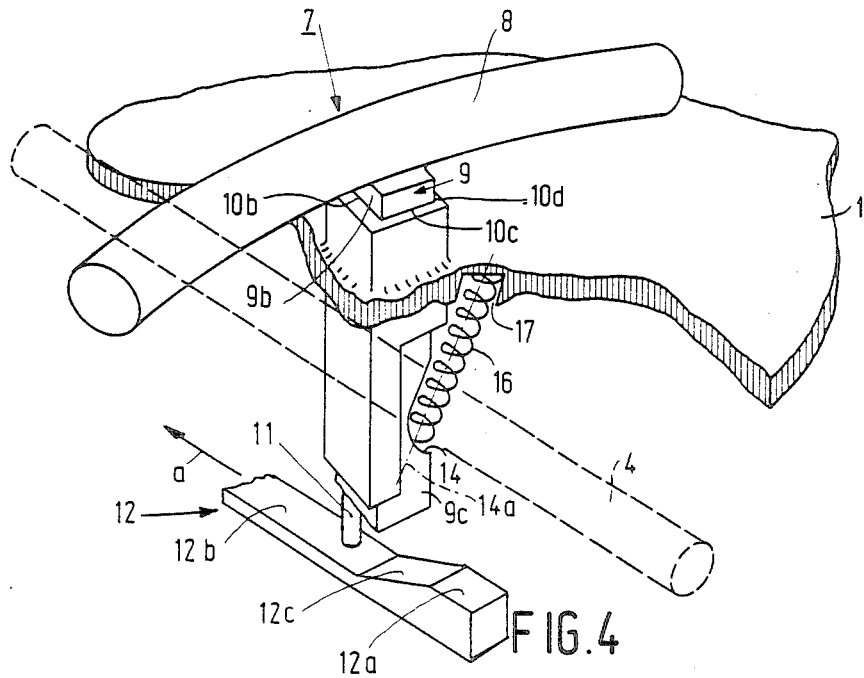
FIG. 4 is a perspective view showing the lifting device of the record player of FIG. 1 in the lowered position.
Figure 5:
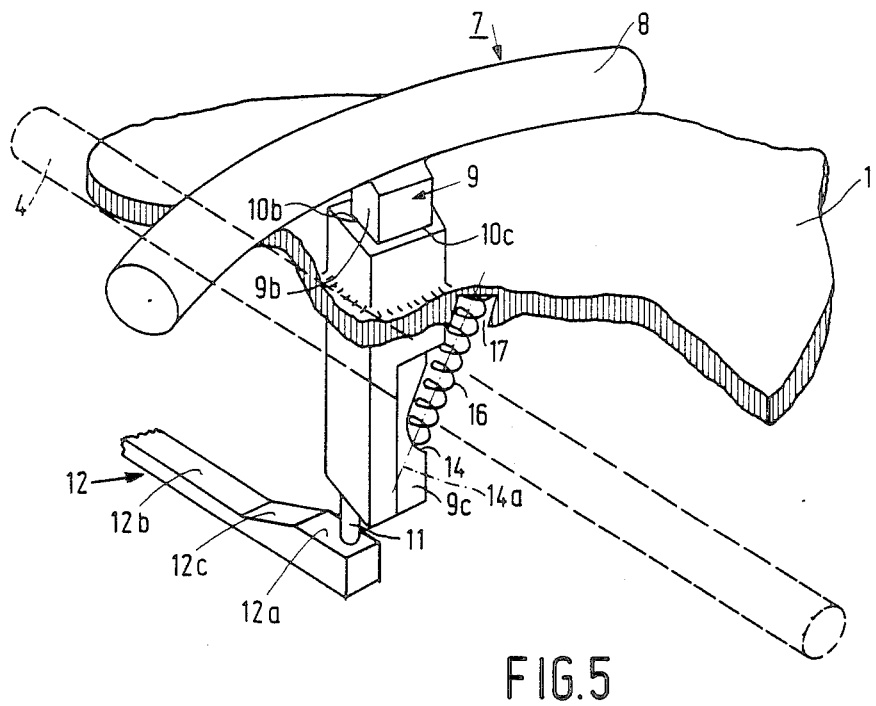
FIG. 5 is a perspective view showing the lifting device of the record player of FIG. 1 in the raised position.

A part of a lifting device 7 for raising and lowering the pick-up arm 4 relative to the upper side of the turntable 2 projects above the deck plate 1. The lifting device 7 comprises an arm support 8 on which the pick-up arm rests during raising or lowering. The arm support 8 has a curved shape, suitably the shape of an arc of a circle concentric with the rotational axis 6a of the disc 6. The arm support 8 is fixed on the upper end of a vertical lifting rod 9 (see also FIGS. 3, 4 and 5).

The lift rod 9 has a substantially square cross-section and is manufactured as an integral unit with the arm support 8 from a plastic by injection-molding. It extends from the arm support 8 down to a point below the deck plate 1. The lift rod 9 is slidably guided in a vertical guide element 10 of tubular shape which forms an integral unit with the deck plate 1. The guide element has a substantially square cross-section corresponding to that the lift rod 9 and comprises a first pair of adjoining guide walls 10a and 10b and a second pair of guide walls 10c and 10d which adjoin one another in the upper part of the guide element but below that are interrupted by an opening which extends over part of the lift rod 9 where the walls 9c and 9d of the rod join another. The purpose of this opening will be described later herein. Preferably, the guide element 10 is injection-molded with the deck plate 1 from a plastic material.

As its lower end the lift rod 9 carries a pin 11 which bears on an actuating member 12 comprising two supporting surfaces 12a and 12b which are situated at different levels and between which a ramp surface 12c extends. The actuating member 12, which is preferably constructed as a plastic slide, can be moved from the position shown in FIGS. 2 and 4 to the position shown in FIG. 5 by a rectilinear sliding movement in the direction indicated by the arrow a in FIG. 2. During this movement the ramp surface 12c cooperates with the pin 11 to raise the lift rod 9, preferably in a direction perpendicular to the deck plate, the rod being guided by the guide element 10. The lifting device 7 can thus raise the pick-up arm 4 as a result of this movement of the actuating member. For lowering the pick-up arm the actuating member 12 is moved in the reverse direction. The actuating member 12 is coupled by means not shown to an actuating button 13 on the upper side of the deck plate 1. By means of the actuating button 13 the actuating member 12 can be moved in the direction indicated by the arrow a, or in the opposite direction, to actuate the lifting device.

The lift rod 9 comprises a first pair of adjoining longitudinal peripheral walls 9a, b which slidably engage the guide walls 10a, b, respectively of the guide element 10, and a second pair of adjoining longitudinal peripheral walls 9c, 9d, which slidably engage the guide walls 10c, 10d, respectively of the guide element. Owing to the substantially square cross-section of the lift rod 9, in cross-section the walls 9a-9d are arranged in a square pattern relative to each other. It is to be noted that the term "square" is to be understood to mean an approximation to a square, because the longitudinal edges of walls of the first pair of adjoining walls 9a, 9b of the lift rod are situated at the corners of the square, but portions of the walls between these edges are slightly recessed. The purpose of this construction is to form between each wall of the first pair of adjoining walls 9a, 9b, of the lift rod 9 and the flat guide wall 10a, 10b respectively, of the guide element 10, a gap for containing a highly viscous substance. In this embodiment this substance is silicone oil, which has a hydraulic action and which remains in these narrow gaps between the walls of the lift rod and the guide walls under the influence of capillary action. Thus, there is no risk of the silicone oil leaking out of the lifting device 7.

In the part of the lift rod 9 which is exposed, through the aforesaid opening in the guide walls 10c and 10d of the guide element 10 a recess 14 is formed in the adjoining edge portions of the walls 9d, 9c of the rod, which recess has a cylindrical wall and a central axis 14a which in the present embodiment makes an acute angle of preferably approximately 60° wih the upper-surface of the deck plate 1. The central axis 14a is situated in a plane 1 15 (see FIG. 3) which bisects the angle between the walls 9a and 9b of the lift rod. One end of a helical compression spring 16 having turns of substantially equal diameter bears against the bottom of the recess 14 and the other end engages in a recess 17 formed in the lower surface of the deck plate 1, the spring passing through the opening in the guide walls 10c and 10d. In this way the spring 16 exerts a force F (see FIG. 2) on the lift rod 9, which force is directed obliquely downwards. The force F may be considered as formed by a force F1 which is directed perpendicularly to the deck plate and a force F2 which is directed parallel to the deck plate 1. The force F2 has component forces F21 and F22 (see FIG. 3) whose directions are such that these forces urge the walls 9a and 9b of the lift rod 9 agains the guide walls 10a and 10b, respectively. The downward force F1 of the spring 16 ensures that when the actuating member 12 is moved from the position shown in FIG. 5 to that shown in FIG. 4 the lifting device 7 is automatically lowered. During this movement an effective damping is obtained as a result of the presence of the silicone oil in the gaps between the walls 9a, 9b of the lift rod and the guide walls 10a and 10b respectively.

The operation of the record player, in particular of the lifting device and the parts which cooperate therewith, will now be described in more detail.

In its rest position the pick-up arm 4 rests on the arm support 8. In this position the lifting device 7 occupies the position shown in FIG. 4, in which the lift rod 9 with the pin 11 is positioned in the lower position under the influence of the pressure exerted by the spring 16. As already stated, the force F exerted by the spring 16 firmly presses the walls 9a, 9b of the lift rod against the guide walls 10a, 10b. The lifting device 7 can be actuated by pressing the actuating button 13, which is latched in the depressed position. As a result of the depression of the button 13 the actuating member 12 is moved in the direction indicated by the arrow a in FIGS. 2 and 4, so that the ramp surface 12c cooperates with the pin 11 to push the lift rod 9 upwards. As the pick-up arm 4 is resting on the arm support 8 the pick-up arm 4 is now moved upwards. The spring 16 is thereby further compressed so that the walls 9a, 9b of the lift rod are constantly urged firmly against the guide walls 10a, 10b of the guide element 10 during the upward movement of the lift rod 9. Consequently, during the upward movement of the lift rod 9, a capillary action is sustained in the gaps between the walls 9a, b and 10a, b, so that the silicone oil remains between these walls. When the lifting device 7 has reached the position shown in FIG. 5, the pick-up arm 4 is lifted off the support 8 and positioned above the turntable and the desired part of the gramophone record either manually or by means of a mechanism, not shown, underneath the deck plate 1, after which the pick-up arm is again rested on the support 8. Subsequently, by pressing the button 13 again, this button is unlatched and it is then moved up under spring force, as a result of which the actuating member 12 returns to the initial position shown in FIG. 4. This results in the lifting device 7 being lowered again so that the pick-up arm, resting on the arm support 8, is moved downwards, which movement is damped effectively by the silicone oil. The damping is important in order to ensure that the stylus of the pick-up head 4a is lowered gently into the groove of the gramophone record.

Figure 2:
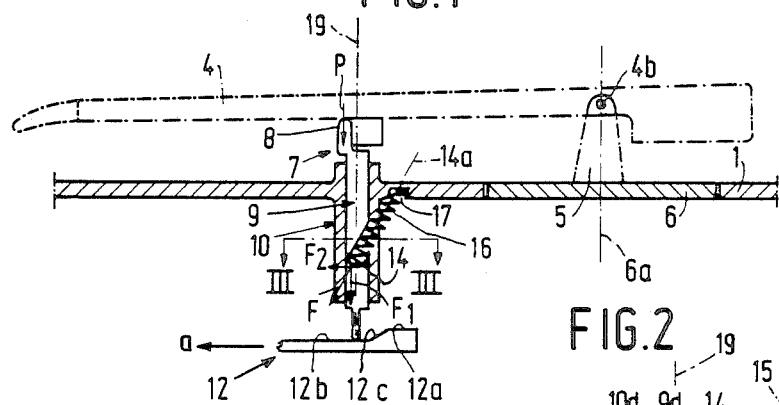
FIG. 2 shows a part of the record player in an enlarged-scale sectional view taken on the lines II—II in FIG. 1.

The lift rod 9 is lowered under the influence of the force P exerted on the lifting device 7 by the weight of the pick-up arm 4, see FIG. 2. In this respect, it is advantageous that the arm support 8 is disposed asymmetrically towards the wall 9a of the lift rod 9 relative to a plane of symmetry 19 of the lift rod 9, which plane contains the central longitudinal axis of the lift rod and extends parallel to the walls 9a and 9c of the rod (see FIGS. 2, 3), so that the force P acting on the arm support 8 during lowering results in an auxiliary torque being exerted on the lift rod 9, which torque ensures that near the upper end of the guide wall 10a the lift rod 9 remains constantly in contact with this wall. A similar effect is obtained when the pick-up arm 4 is lifted. It is to be noted that the plane 19 is situated at equal distances from and extends parallel to the walls 9a and 9c of the lift rod 9. Alternatively, this plane may be a diagonal plane containing the line of intersection of the planes of the walls 9a, 9d and the line of intersection of the planes of the walls 9b, 9c, in which case the auxiliary torque has the advantage that the lift rod is pressed against both the upper end of both the guide wall 10a and the guide wall 10b. Thus, under the influence of the weight of the pick-up arm 4, among other factors it is ensured that during raising and lowering the wall 9a and 9b of the lift rod are guided correctly by the guide element 9. A square cross-section is advantageous for the lift rod 9 and a corresponding cross-section for the guide element 10. It is to be noted that the lift rod and the guide element may have a different cross-sectional shape, but care should be taken that the vector of the force F exerted by the spring 16 extends in the bisecting plane which contains the line of intersection of the planes of two walls of the lift rod which correspond to the walls 9a, 9b. Further, it is important that between the two walls of the lift rod and the two guide walls cooperating therewith, gaps are formed of a size such that a satisfactory capillary action is obtained to ensure that the highly viscous material remains in the gaps and does not leak away.

The record player in accordance with the invention has the advantage that its lifting device comprises a minimal number of parts. For assembling the lifting device only the integral unit, which is injection-molded in one piece and which comprises the arm support 8 and the lift rod 9 with the pin 11, is required. Further, when the silicone oil has been applied to the walls 9a, 9b of the lift rod 9 the rod has merely to be pressed into the guide element 10 and the spring 16 fitted in the recess 14 and the recess 17, after which the lifting device is ready for use. It is to be noted that the guide element 10 can be manufactured integrally with the deck plate 1 by injection-molding using one die, so that the guide element 10 need not be mounted separately. In this respect it is also advantageous that the guide walls 10a, 10b are flat, because such a construction is easy to achieve with the comparatively large die required for the deck plate. The guide walls may taper slightly relative to each other, provided that these walls are flat.

Tolerances in the parts used cannot affect the correct operation of the lifting device. Such tolerances are eliminated automatically because the walls 9a, 9b of the lift rod 9 are urged against the guide walls 10a, 10b. Hence, it is not necessary for the other guide walls 10c, 10d to provide accurate guidenace for the second pair of walls 9c, 9d of the lift rod.

The use of a small number of parts, which are preferably injection-molded from a plastic material, the easy assembly, and the reliable operation of the damped lifting device enable the record player in accordance with the invention to be manufactured cheaply in mass production.

What is claimed is:

1. A record player comprising:
   a deck plate,
   a turntable and a pick-up arm carried on said deck plate, and
   a lifting device which can be moved upwards and downwards to lift and lower the pick-up arm relative to the upper side of the turntable, said lifting device comprising an arm support, a lift rod, damping means, a guide element connected to the deck plate, and an actuating member,
   said lift rod forming an integral unit with said support and being guided by said guide element, and cooperating with said actuating member for moving the lifting device upwards and downwards, and
   said damping means comprising a highly viscous substance for damping at least the downward movement of the lifting device, characterized in that the lift rod comprises a pair of longitudinal peripheral walls defining planes which are arranged at an angle with each other so as to define a line of intersection, and engage a corresponding pair of guide walls of the guide element, the guide element forms an integral unit with the deck plate, the highly viscous substance is retained between said walls of the lift rod and said guide walls, and a spring element is arranged between the deck plate and the lift rod, such that said element exerts a force on the lift rod, said force being directed downwardly and towards said line of intersection of the planes of said walls of the lift rod to urge these walls against said guide walls.

2. A record player as claimed in claim 1, characterized in that the lift rod has a square cross-section and the force vector of the spring element extends in a plane which bisects the angle between said walls of the lift rod.

3. A record player as claimed in claim 2, characterized in that the spring element is a helical spring, and in that a recess with a cylindrical wall is formed in the lift rod at a location where the walls of a pair of adjoining peripheral walls of the lift rod join each other, which recess has a central axis situated in said bisecting plane and contains that end portion of the helical spring which is remote from the deck plate.

4. A record player as claimed in any of the preceding claims, characterized in that the arm support is disposed asymmetrically towards at least one of the walls of the first-mentioned pair of walls of the lift rod relative to a plane of symmetry of the lift rod.

5. A record player as claimed in claim 4, characterized in that at least near the location where it adjoins the deck plate the guide element is of tubular shape with a square cross-section and comprises a second pair of guide walls which, at a distance below the deck plate, are formed with an opening through which the spring element passes to act on the lift rod.

6. A record player as claimed in claim 5, characterized in that the first-mentioned pair of guide walls are flat, the first-mentioned pair of walls of the lift rod engage the respective guide walls adjacent the edges, and between the first-mentioned pair of walls of the lift rod and the respective guide walls gaps are formed which contain the highly viscous substance.

7. A record player as claimed in claim 4, characterized in that the first-mentioned pair of guide walls are flat, the first-mentioned pair of walls of the lift rod engage the respective guide walls adjacent the edges, and between the first-mentioned pair of walls of the lift rod and the respective guide walls gaps are formed which contain the highly viscous substance.

8. A record player as claimed in claim 1, 2 or 3, characterized in that the first-mentioned pair of guide walls are flat, the first-mentioned pair of walls of the lift rod engage the respective guide walls adjacent the edges, and between the first-mentioned pair of walls of the lift rod and the respective guide walls gaps are formed which contain the highly viscous substance.

9. A record player as claimed in claim 2 or 3, characterized in that at least near the location where it adjoins the deck plate the guide element is of tubular shape with a square cross-section and comprises a second pair of guide walls which, at a distance below the deck plate, are formed with an opening through which the spring element passes to act on the lift rod.

* * * * *